US008860380B2

(12) United States Patent
Hasler

(10) Patent No.: US 8,860,380 B2
(45) Date of Patent: Oct. 14, 2014

(54) METHOD FOR ENERGIZING A CHAIN-LINK CONVERTER, CONTROLLER, COMPUTER PROGRAMS AND COMPUTER PROGRAM PRODUCTS

(71) Applicant: Jean-Philippe Hasler, Vasteras (SE)

(72) Inventor: Jean-Philippe Hasler, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 14/102,108

(22) Filed: Dec. 10, 2013

(65) Prior Publication Data

US 2014/0097804 A1 Apr. 10, 2014

Related U.S. Application Data

(63) Continuation of application No. PCT/EP2011/059648, filed on Jun. 10, 2011.

(51) Int. Cl.
| | |
|---|---|
| *H02J 7/00* | (2006.01) |
| *H02M 3/06* | (2006.01) |
| *H02M 5/00* | (2006.01) |
| *H02M 5/275* | (2006.01) |
| *H02M 5/293* | (2006.01) |
| *H02M 7/483* | (2007.01) |
| *H02J 3/18* | (2006.01) |
| *H02M 1/36* | (2007.01) |
| *H02M 1/32* | (2007.01) |

(52) U.S. Cl.
CPC ............... *H02J 7/00* (2013.01); *H02M 7/483* (2013.01); *H02M 2001/325* (2013.01); *H02J 3/18* (2013.01); *H02M 1/36* (2013.01); *Y02E 40/30* (2013.01); *H02M 2007/4835* (2013.01)
USPC ........................... 320/166; 320/167; 307/109

(58) Field of Classification Search
CPC ................................ H02J 7/345; H02J 7/0016
USPC ............ 320/166, 167; 307/109; 363/159, 163
See application file for complete search history.

(56) References Cited

U.S. PATENT DOCUMENTS 6,781,256 B2 * 8/2004 Loechner ..................... 307/46
2010/0080022 A1 4/2010 Schmidt
(Continued)

FOREIGN PATENT DOCUMENTS

| CN | 2785249 Y | 5/2006 |
|---|---|---|
| EP | 2282399 A1 | 2/2011 |

(Continued)

OTHER PUBLICATIONS

International Search Report and Written Opinion of the International Searching Authority Application No. PCT/EP2011/059648 Completed: Apr. 12, 2012; Mailing Date: Apr. 20, 2012 12 pages.

(Continued)

*Primary Examiner* — Richard V Muralidar
*Assistant Examiner* — David Henze-Gongola
(74) *Attorney, Agent, or Firm* — St. Onge Steward Johnston & Reens LLC

(57) ABSTRACT

A method in a controller for energizing a chain-link converter including one or more phase legs, each phase leg including a number of series-connected converter cells, each converter cell including four valves arranged in an H-bridge connection with a DC capacitor. Each valve in turn includes a semiconductor switch in parallel with a diode. The method includes the steps of: charging the DC capacitor of each converter cell to a voltage level at which the semiconductor switches are controllable but below their nominal voltage; diagnosing the converter cells so as to detect failed components thereof; bypassing faulty components in a controlled manner; charging the DC capacitors to their nominal voltage. The invention also relates to a controller, computer programs and computer program products.

11 Claims, 3 Drawing Sheets

(56) References Cited

U.S. PATENT DOCUMENTS

| | | |
|---|---|---|
| 2010/0090663 A1* | 4/2010 | Pappas et al. ............ 320/166 |
| 2011/0013441 A1* | 1/2011 | Gruber et al. ............ 363/154 |
| 2011/0019449 A1 | 1/2011 | Katoh et al. |

FOREIGN PATENT DOCUMENTS

| | | |
|---|---|---|
| WO | 2010051854 A1 | 5/2010 |
| WO | 2010102666 A1 | 9/2010 |
| WO | 2010127699 A1 | 11/2010 |
| WO | 2011012174 A1 | 2/2011 |
| WO | 2011023237 A1 | 3/2011 |
| WO | 2012143037 A2 | 10/2012 |

OTHER PUBLICATIONS

Ainswort, et al.: "StaticVar Compensator (STATCOM) Based on Single-Phase Chain Circuit Converters"; 1998; pp. 381-386.

* cited by examiner

METHOD FOR ENERGIZING A CHAIN-LINK CONVERTER, CONTROLLER, COMPUTER PROGRAMS AND COMPUTER PROGRAM PRODUCTS

FIELD OF THE INVENTION

The invention relates generally to the field of electric power network devices, and in particular to static compensators based on chain-link converters.

BACKGROUND OF THE INVENTION

STATCOM (Static Compensator) converters based on chain-link topology are emerging technology nowadays. A three-phase chain-link converter, being a voltage source converter (VSC) device, comprises three phase legs, each phase leg comprising a number of series-connected cell converters. FIG. 1 illustrates such a three-phase chain-link converter 1 comprising a voltage source converter 2. The three phase legs are denoted L1, L2, L3 and are connected in a delta arrangement, but are in other set-ups connected in a wye arrangement. Each phase leg comprises a number of series-connected converter cells, e.g. phase leg L1 comprises converter cells 10, 11, 12, . . . , n. Each converter cell 10, 11, 12, . . . , n, sometimes denoted converter link, comprises four valves connected in a H-bridge arrangement with a capacitor unit 13. Each valve comprises a transistor switch 19, such as an insulated gate bipolar transistor (IGBT) having a free-wheeling diode 20 (also denoted anti-parallel diode) connected in parallel thereto.

The chain-link converter 1, and in particular each phase leg thereof, is connected to an electrical power grid 14, in the illustrated case a three-phase network, via a phase reactor 15. Further, each phase leg is connected to the power grid 14 via a starting resistor 17 connected in parallel with a switch 16 and via an AC circuit breaker 18.

Generally, when the chain-link converter of this type is to be energized and started, and using phase leg L1 as an example, the circuit breaker 18 is switched so as to provide a current path from the power grid 14, through the starting resistor 17, the phase reactor 15 and through the diodes of the chain-link converter 1, thereby charging the capacitor 13. When the capacitor voltage has reached a predetermined level, the starting resistor 17 is short-circuited by closing the parallel connected switch 16. The capacitor voltage will then increase further and the switches become controllable.

Start-up of such chain-link converters involves a number of considerations. For example, in WO 2010/051854 one aspect of start-up of converters is addressed. In this publication a method for starting a chain-link converter is disclosed, wherein a power source is connected to at least one converter cell of a phase leg, thereby improving the start-up e.g. by lessening the stress put on components such as diodes.

In another aspect, during start-up of the chain-link converter, some of the electronic switches may be defective, they could for example being in open circuit or in short-circuit. If energizing the chain-link converter 1 by limiting in-rush currents by means of the phase reactor 15 only, failed electronic switches in open circuit may be exposed to a voltage level above their voltage withstand capability and thus cause other electronic switches to break down.

In view of the above, it would be desirable to provide start-up procedures of chain-link converters for avoiding cascading failure of other components.

SUMMARY OF THE INVENTION

An object of the invention is to provide a method for energizing a chain-link converter addressing the above problem.

The object is according to a first aspect of the invention achieved by a method in a controller for energizing a chain-link converter comprising one or more phase legs. Each phase leg comprises a number of series-connected converter cells and each converter cell comprises four valves arranged in an H-bridge connection with a DC capacitor. Each valve in turn comprises a semiconductor switch in parallel with a diode. The method comprises the steps of: charging the DC capacitor of each converter cell to a voltage level at which the semiconductor switches are controllable but below their nominal voltage; diagnosing the converter cells so as to detect failed components thereof; bypassing faulty components in a controlled manner; and charging the DC capacitors to their nominal voltage.

In accordance with the invention, the current is limited by means of a starting resistor, and a monitoring of the chain-link converter cells is performed at a low voltage level in order to prevent damage to components thereof.

In an embodiment, the step of charging comprises closing an AC breaker arranged between a power network and the chain-link converter and charging the DC capacitor through a starting resistor arranged between the AC breaker and the chain-link converter.

In an embodiment, the step of diagnosing comprises receiving, in the controller, data from converter cell control and protection units connected to gate units of the converter cells, and determining based on the data whether a converter cell comprises a faulty component.

In the above embodiment, faulty components may be identified by monitoring voltage of healthy components.

In an embodiment, the step of bypassing failed components comprises the sub-steps of: discharging the DC capacitors of converter cells diagnosed to comprise a faulty component; bypassing converter cells comprising faulty component by providing an alternative current path through healthy components thereof or by closing a switch arranged in parallel with the converter cell comprising the faulty component.

In an embodiment, the method comprises the further step of closing a starting resistor switch arranged in parallel with a starting resistor, the starting resistor arranged between a power network and the chain-link converter, whereby the DC capacitors are charged to their nominal voltage.

In an embodiment the voltage level at which the semiconductor switches are controllable comprises a voltage level at which they just become controllable.

In different embodiments the phase legs are connected in a delta configuration or in a wye configuration.

In an embodiment, the method comprises the additional step of, performed prior to the step of bypassing the faulty components, discharging the DC capacitors of faulty cells.

The object is according to a second aspect of the invention achieved by a controller for energizing a chain-link converter comprising one or more phase legs. Each phase leg comprises a number of series-connected converter cells and each converter cell comprises four valves arranged in an H-bridge connection with a DC capacitor. Each valve in turn comprises a semiconductor switch in parallel with a diode, the controller arranged to: enable the charging of the DC capacitor of each converter cell to a voltage level at which the semiconductor switches are controllable but below their nominal voltage; diagnose the converter cells so as to detect failed components thereof; enable bypassing of faulty components in a controlled manner; enable charging the DC capacitors to their nominal voltage.

The object is according to a third aspect of the invention achieved by a computer program for energizing such a chain-link converter. The computer program comprises computer program code, which, when run on a controller, causes the controller to perform the steps of: enable the charging of the DC capacitor of each converter cell to a voltage level at which the semiconductor switches are controllable but below their nominal voltage; diagnose the converter cells so as to detect failed components thereof; enable discharging the DC capacitor of faulty cell; enable bypassing of faulty components in a controlled manner; enable charging the DC capacitors to their nominal voltage.

The object is according to a fourth aspect of the invention achieved by a computer program product comprising a computer program as above and a computer readable means on which the computer program is stored.

Further features and advantages of the invention will become clear upon reading the following description and the accompanying drawings.

DETAILED DESCRIPTION OF THE INVENTION

Figure 1:
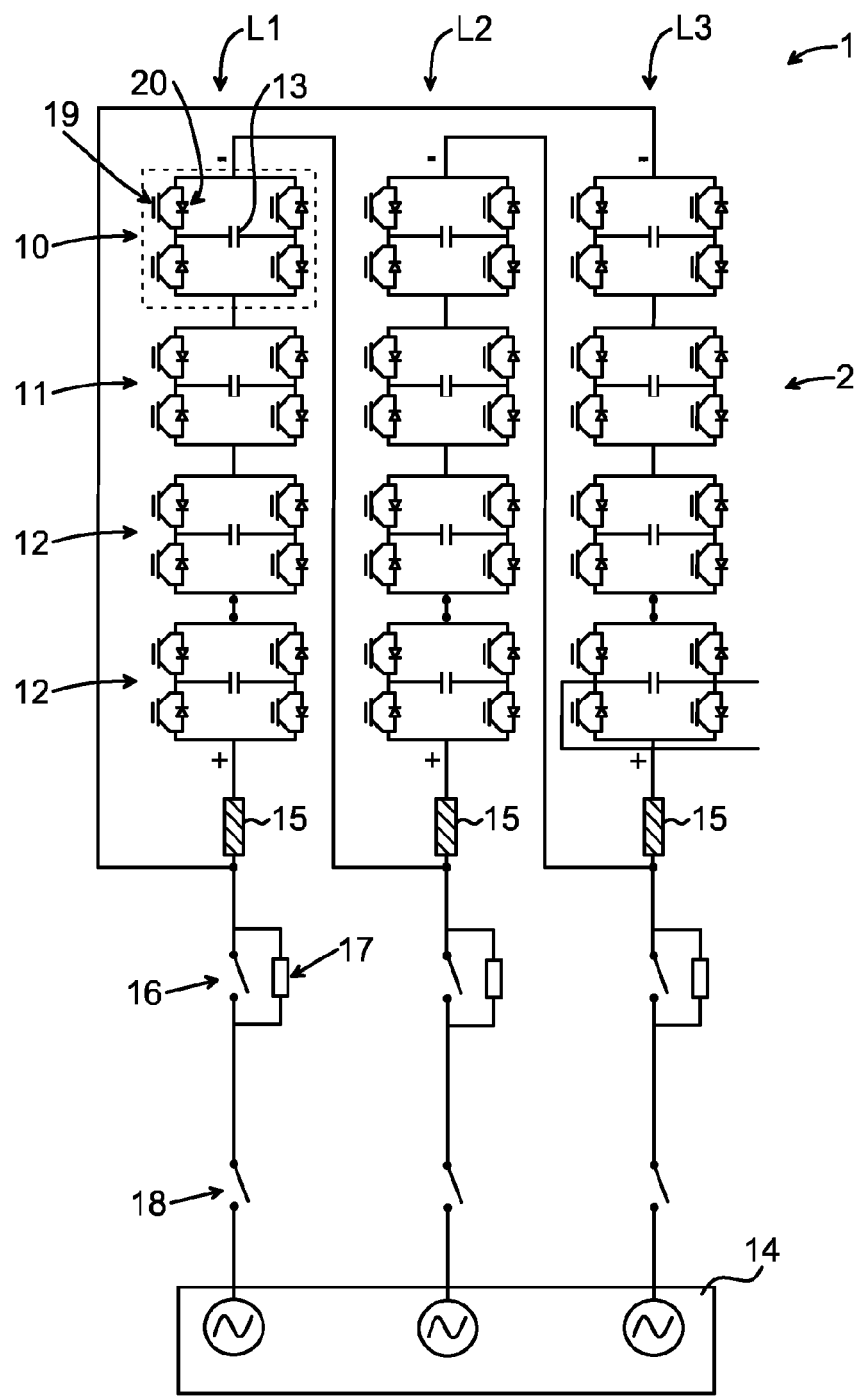
FIG. 1 illustrates a prior art three-phase chain-link converter.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like reference numerals refer to like elements throughout the description.

Figure 2:
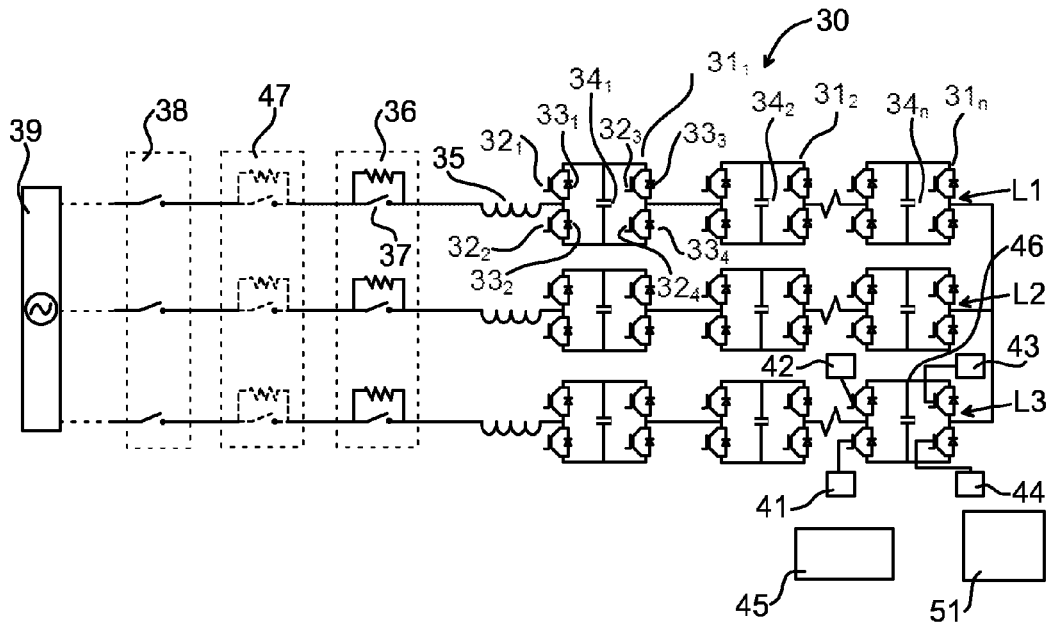
FIG. 2 illustrates a delta-connected three-phase chain-link converter, for which aspects of the invention may be implemented.

FIG. 2 illustrates a delta-connected three-phase chain-link converter, for which aspects of the invention may be implemented. The three phase chain link converter 30 is of the type described with reference to FIG. 1. In particular, the chain-link converter 30 comprises a voltage source converter having three phase legs L1, L2, L3 connected in a delta arrangement. Each phase leg comprises a number of series-connected converter cells. Taking phase leg L1 as an example, it comprises converter cells $31_1, 31_2, \ldots, 31_n$, each converter cell comprising four valves connected in a H-bridge arrangement with a capacitor unit 34. Each valve in turn comprises a transistor switch 32, such as earlier mentioned IGBT, having a free-wheeling diode 33 connected in parallel thereto. In the following IGBT is used when describing aspects of the invention, but other semiconductor devices could be used, e.g. gate turn-off thyristors (GTO) or Integrated Gate-Commutated Thyristors (IGCT).

The phase leg L1 is connected to an electrical power grid 39, e.g. a three-phase power grid, via a phase reactor 35. Further, the phase leg L1 is connected to the power grid 39 via a starting resistor 36 connected in parallel with a starting resistor switch 37 and via an AC circuit breaker 38. The other phase legs L2, L3 are arranged in a corresponding manner.

A controller 50 is arranged to control the chain-link converter 1, for example controlling the switching of the IGBTs of the converter cells. Each IGBT of each converter cell is connected to a gate unit. For example, the IGBTs of a converter cell 46 of phase leg L3 are connected to a respective gate units 41, 42, 43, 44, which in turn are connected to a converter cell control and protection unit 45. The converter cell control and protection units (e.g. converter cell control and protection unit 45 of phase leg L3) of a converter cell are able to communicate with the controller 50, for example by being connected to a communication bus (not illustrated).

In accordance with an aspect of the invention, a method is provided enabling a safe start of the chain-link converter 30. Briefly, faulty cells are detected and bypassed before the DC capacitors of the chain-link converter are fully loaded. The chain-link converter 30 can then be operated with the faulty cells without risk of subsequent failures of other components.

In accordance with an embodiment, the chain-link converter 30 is energized in accordance with the following sequence, described for the first phase leg L1 for rendering the description clear and concise. The second and third phase legs L2, L3 of the chain-link converter 30 are energized simultaneously in a corresponding manner.

Upon energizing the chain-link converter 30, the main AC circuit breaker 38 of phase leg L1 is closed, and the starting resistor switch 37 connected in parallel with the starting resistor 36 is open. Thereby the DC capacitors $34_1, 34_2, \ldots, 34_n$ are charged at a low voltage rate to a certain charging level. The charging level to which the DC capacitors $34_1, 34_2, \ldots, 34_n$ are charged is chosen so as to just reach a voltage level at which the electronic switches (e.g. IGBT 32) are controllable. As an example such voltage level could be about 600 V for a component having a rated value of 2.4 kV. It is realized that the voltage level depends on the rated value of the component.

Failed converter cell components, e.g. electronic switches, are then detected by means of the gate units 41, 42, 43, 44 and the converter cell control and protection units and the controller 50. In particular, the controller 50 receives data from the converter cell control and protection unit 45, which in turn receives data from the gate units 41, 42, 43, 44. The controller 50 is arranged to detect a faulty component based on data, such as converter cell DC voltage or converter cell AC current, or converter AC voltage received from these units.

Upon detection of a fault, a zero output voltage mode is entered for the converter cell having the faulty component. This is accomplished by the controller 50 transmitting a control signal to this end. In particular, the output voltage of the chain link converter 30 is controlled by control signals that are applied to the converter cells. The converter cells can be put in a zero voltage mode by the controller 50 transmitting a control signal to this end, i.e. transmitting a control signal so that a zero output voltage is provided at the output voltage AC terminals of the converter cell.

The DC capacitors of the converter cells having faulty components, if any, e.g. faulty electronic switches or gate units, are discharged in a controlled manner. One way of discharging the DC capacitor in a controlled manner is by initiating the zero voltage mode of a healthy converter cell and by using a healthy component of the faulty converter cell. The phase leg current is limited by means of the charging resistor 36.

The provision of a current path for the phase current in a failed cell through a healthy IGBT in an opposite branch in parallel with the failed IGBT (which is in short-circuit mode) is described in a co-pending patent application entitled "Method in a voltage source chain-link converter, computer programs and computer program products" (PCT/EP2011/056153), and assigned to the same applicant as the present application. In the same application, a way of discharging the cell when the failed IGBT is in open-circuit mode is described, wherein the DC capacitor of the cell is discharged by the remaining three healthy IGBT if the failed IGBT is in open-circuit mode.

Another way of discharging the DC capacitor of IGBT position having faulty component is to provide an external power source for enabling the discharging. In particular, the electronic circuitry controlling the IGBT switches are powered from the voltage across the switches. At low DC voltage, the electronic circuit will stop functioning and external power is required to operate the switch at low voltage. External power supply can be provided by a switch of a healthy neighbor cell or through the fiber optic link connecting the electronic board controlling the switch to the main control by means of high energy laser light.

Once the voltage of the DC capacitors of the faulty converter cells is zero, then a bypass mode is initiated for the faulty converter cells, and the DC capacitor thereof is short-circuited by means of the healthy electronic switches of the converter cell comprising the faulty device.

The bypass of the faulty converter cells can be accomplished in different ways.

The converter cells can alternatively be bypassed by a mechanical bypass switch, which is closed when a faulty component of the converter cell is detected, thus bypassing it. The control of such mechanical switches can be accomplished by suitable software in the controller 50. In particular, the controller 50 receives data from the gate units 41, 42, 43, 44 and the converter cell control and protection unit 45, as described earlier, and when detecting that a converter cell has a faulty component, a signal is sent to the mechanical switch connected in parallel with this converter cell for closing it, thereby bypassing the converter cell.

In the next step of the energizing sequence, the zero-voltage mode of the healthy converter cells is disabled, and the DC capacitors of these healthy converter cells are charged to their nominal voltage.

When the DC capacitors $34_1, 34_2, \ldots, 34_n$ reach their nominal voltage, the starting resistor switch 37 is closed thus short-circuiting the starting resistor 36. The chain-link converter 30 is now ready to be put into operation having all (if any) unhealthy converter cells bypassed.

Figure 3:
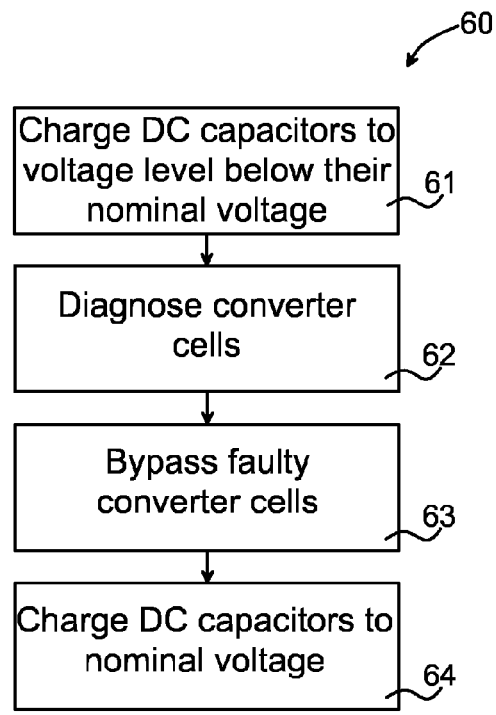
FIG. 3 illustrates a flow chart over steps of a method in an embodiment of the invention.

The above is summarized with reference to FIG. 3, illustrating a flow chart over steps of a method in an embodiment of the invention.

The method 60 may be implemented in the controller 50 and be used for energizing the chain-link converter 30 as described. The method 60 comprises the first step of charging 61 the DC capacitor $34_1, 34_2, \ldots, 34_n$ of each converter cell $31_1, 31_2, \ldots, 31_n$ to a voltage level at which the semiconductor switches are controllable but which is below their nominal voltage. This can be done by closing the AC circuit breakers 38 at a low voltage rate and keeping the starting resistor switches at open position. The starting resistors 36 limit the current through the respective phase legs L1, L2, L3.

The method 60 comprises the second step of diagnosing 62 the converter cells $31_1, 31_2, \ldots, 31_n$ so as to detect faulty components thereof. This is done as soon as the voltage level of the capacitors is such that the semiconductor switches are controllable. The converter cell earlier described control and protection units 45 and the gate units 41, 42, 43, 44 of the converter cells $31_1, 31_2, \ldots, 31_n$ are used for this end. For example, the voltage of healthy components can be monitored in order to identify faulty components. For example, faulty IGBT may be detected by determining that there is no communication between a main control and the IGBT control. A faulty IGBT may be detected by voltage monitoring of healthy IGBT or by short-circuit detection of the healthy IGBT in the same leg (short through detector).

The method 60 comprises the third step of bypassing 63 failed components in a controlled manner. This can be done by firstly discharging the DC capacitors $34_1, 34_2, \ldots, 34_n$ of converter cells diagnosed to comprise a faulty component, and by then bypassing converter cells $31_1, 31_2, \ldots, 31_n$ comprising faulty component by providing an alternative current path through healthy components thereof or by closing a switch arranged in parallel with the converter cell $31_1, 31_2, \ldots, 31_n$ comprising the faulty component, as described earlier.

The method 60 comprises the fourth step of charging 64 the DC capacitors $34_1, 34_2, \ldots, 34_n$ to their nominal voltage. The starting resistor switch 37 is closed, whereby the starting resistor 36 is short-circuited and the DC capacitors $34_1, 34_2, \ldots, 34_n$ are charged to their nominal voltage.

In an embodiment, the step of diagnosing 62 comprises:
performing diagnostic of the control communication between the main controller and each individual switch controls,
initiating a zero-voltage output mode by turning on alternatively one pair of switches connected to the same ac output terminal in order to detect switches failing to turn on,
initiating the zero-voltage mode by turning on alternatively the other pair of switches connected to the same ac output terminal in order to detect switches failing to turn on,
if a failed switch is detected as open (not short-circuited) then zero-voltage mode is completed by turning on the switch in the same branch of the failed switch in order to discharge the dc capacitor.
detection of a failed switch will immediately initiate zero-voltage mode until the dc capacitor is fully discharged by initiating zero-voltage mode using the pair of healthy switches
when the dc capacitor is zero (or close) then bypass mode is initiated by turning on continuously the upper pair healthy switches or lower pair healthy switches.

The method 60 may also comprise a step of discharging the DC capacitors of faulty cells, which step would then preferably be performed prior to the step of bypassing the faulty components.

It is noted that the pairs of starting resistor and switch (e.g. starting resistor 36 and switch 37 of phase leg L1) can be arranged in the delta side as illustrated in FIG. 2 or on the line side, as illustrated by the box 47 drawn with dashed lines, comprising starting resistor and switch pairs also drawn with dashed lines. If the starting resistors and associated switches are connected in the delta side (in series with the phase reactor), then the starting resistor can be used for discharging the DC capacitors when the chain-link converter is switched off.

Figure 4:
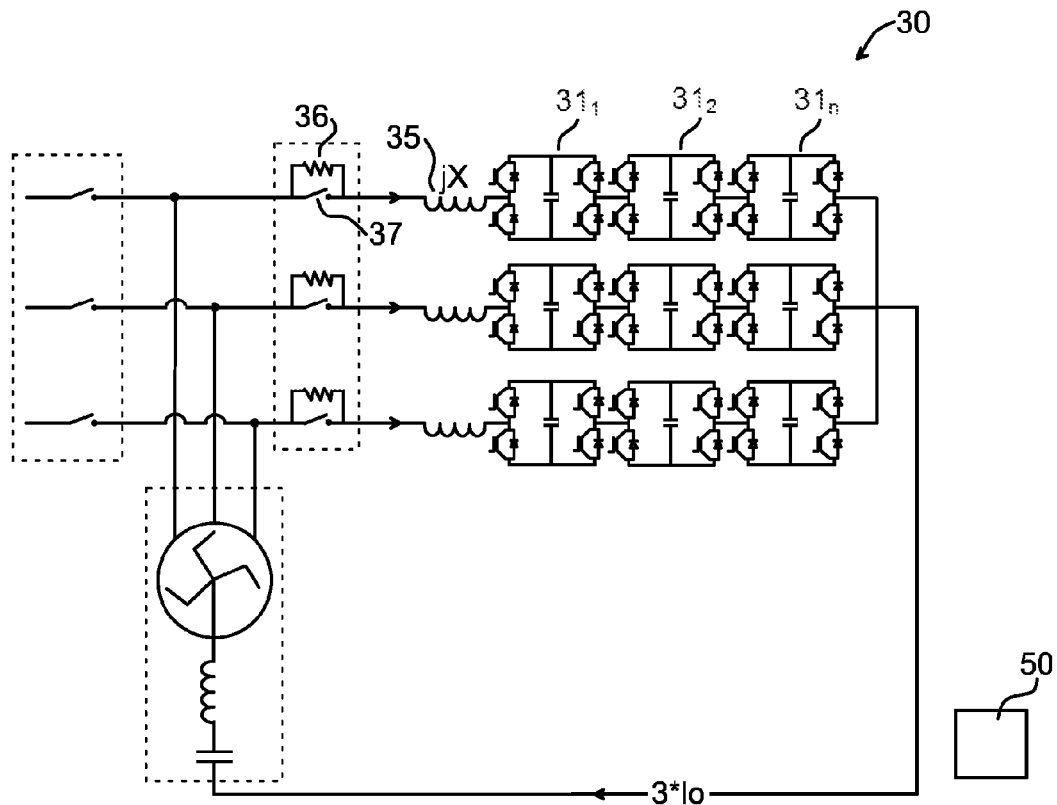
FIG. 4 illustrates a wye-connected three-phase chain-link converter, for which aspects of the invention may be implemented.

FIG. 4 illustrates a wye-connected three-phase chain-link converter, for which aspects of the invention may be implemented. In particular, FIG. 4 illustrates the three-phase chain-link converter 30 connected in a wye arrangement and comprising a tuned zero-sequence filter. The methods as described are also applicable for such configuration.

Figure 5:
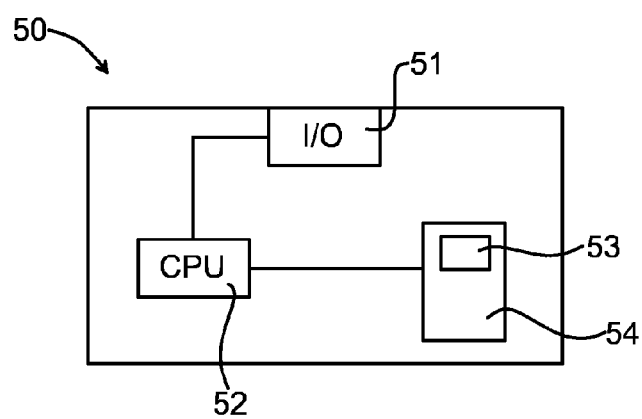
FIG. 5 illustrates a controller for controlling a chain-link converter.

FIG. 5 illustrates means for implementing the methods as described, and in particular the controller 50 for controlling a chain-link converter as described. The controller 50 comprises a processor 52, e.g. a central processing unit, microcontroller, digital signal processor (DSP), etc., capable of executing software instructions stored in a computer program product 54 e.g. in the form of a memory. The processor 52 is connected to an input device 51, that receives inputs e.g. from the earlier described converter cell control and protection units 45 connected to gate units 41, 42, 43, 44 of the converter cells $31_1$, $31_2$, ..., $31_n$. It is noted that although only one processor 52 is illustrated in FIG. 5, the implementation may comprise distributed hardware so that several CPUs are used rather than one when running the software. Likewise, although only one input device 51 is illustrated, there may be several input devices.

The described methods and algorithms or parts thereof for energizing the chain-link converter 30 may be implemented e.g. by software and/or application specific integrated circuits in the processor 52. To this end, the controller 50 may further comprise a computer program 53 stored on the computer program product 54.

With reference still to FIG. 5, the invention also encompasses such computer program 53 for handling energizing of chain-link converters. The computer program 53 comprises computer program code which when run on the controller 50, and in particular the processor 52 thereof, causes the controller 50 to perform the methods as described.

A computer program product 54 is thus also provided comprising the computer program 53 and computer readable means on which the computer program 53 is stored. The computer program product 54 can be any combination of read and write memory (RAM) or read only memory (ROM). The computer program product 54 may also comprise persistent storage, which, for example can be any single one or combination of magnetic memory, optical memory, or solid state memory.

What is claimed is:

1. A method for energizing a chain-link converter comprising one or more phase legs, each phase leg comprising a number of series-connected converter cells, each converter cell comprising four valves arranged in an H-bridge connection with a DC capacitor, and each valve in turn comprising a semiconductor switch in parallel with a diode, the method comprising the following steps in listed order:
    charging the DC capacitor of each converter cell to a voltage level below their nominal voltage so that the semiconductor switches are controllable,
    diagnosing the converter cells so as to detect failed components thereof,
    discharging the DC capacitors of faulty cells,
    bypassing faulty components in a controlled manner, and
    charging the DC capacitors to their nominal voltage.

2. The method as claimed in claim 1, wherein the step of charging comprises closing an AC breaker arranged between a power network and the chain-link converter and charging the DC capacitor through a starting resistor arranged between the AC breaker and the chain-link converter.

3. The method as claimed in claim 1, wherein the step of diagnosing comprises receiving, in the controller, data from converter cell control and protection units connected to gate units of the converter cells, and determining based on the data whether a converter cell comprises a faulty component.

4. The method as claimed in claim 3, wherein faulty components are identified by monitoring voltage of healthy components.

5. The method as claimed in claim 1, wherein the step of bypassing failed components comprises:
    bypassing converter cells comprising faulty component by providing an alternative current path through healthy components thereof.

6. The method as claimed in claim 1, wherein the step of bypassing failed components comprises:
    bypassing converter cells comprising faulty component by closing a switch arranged in parallel with the converter cell comprising the faulty component.

7. The method as claimed in claim 1, comprising the further step of closing a starting resistor switch arranged in parallel with a starting resistor, the starting resistor arranged between a power network and the chain-link converter, whereby the DC capacitors are charged to their nominal voltage.

8. The method as claimed in claim 1, wherein the voltage level at which the semiconductor switches are controllable comprises the minimum at which the semiconductor switches become controllable.

9. The method as claimed in claim 1, wherein the phase legs are connected in a delta configuration or in a wye configuration.

10. A controller for energizing a chain-link converter comprising one or more phase legs, each phase leg comprising a number of series-connected converter cells, each converter cell comprising four valves arranged in an H-bridge connection with a DC capacitor, and each valve in turn comprising a semiconductor switch in parallel with a diode, the controller arranged to enable the following steps in listed order:
    enable the charging of the DC capacitor of each converter cell to a voltage level at which the semiconductor switches are controllable but below their nominal voltage,
    diagnose the converter cells so as to detect failed components thereof,
    enable discharging of the DC capacitors of faulty cells,
    enable bypassing of faulty components in a controlled manner, and
    enable charging of the DC capacitors to their nominal voltage.

11. A non-transitory computer readable storage medium storing a program executed by a computer for energizing a chain-link converter comprising one or more phase legs, each phase leg comprising a number of series-connected converter cells, each converter cell comprising four valves arranged in an H-bridge connection with a DC capacitor, and each valve in turn comprising a semiconductor switch in parallel with a diode, the computer program comprising computer program code, which, when run on a controller, causes the controller to perform the following steps in listed order:
    enable the charging of the DC capacitor of each converter cell to a voltage level at which the semiconductor switches are controllable but below their nominal voltage,
    diagnose the converter cells so as to detect failed components thereof,
    enable discharging of the DC capacitors of faulty cells;
    enable bypassing of faulty components in a controlled manner, and
    enable charging of the DC capacitors to their nominal voltage.

* * * * *